United States Patent [19]
Elliott

[11] 3,842,510
[45] Oct. 22, 1974

[54] ELECTRIC OUTLET BOX LOCATOR
[76] Inventor: Bill J. Elliott, 8297 W. Dry Creek Rd., Healdsburg, Calif. 95448
[22] Filed: June 25, 1973
[21] Appl. No.: 372,800

[52] U.S. Cl.......... 33/180 R, 33/174 G, 33/DIG. 10
[51] Int. Cl........ G01b 5/14, G01b 3/02, B25h 7/00
[58] Field of Search........ 33/174 G, 180 R, DIG. 10

[56] References Cited
UNITED STATES PATENTS

| 2,733,513 | 2/1956 | Gatineau | 33/DIG. 10 |
|---|---|---|---|
| 3,672,064 | 6/1972 | Elkins et al. | 33/DIG. 10 |
| 3,812,587 | 5/1974 | Elkins et al. | 33/180 R |
| D230,628 | 3/1974 | Sunley | 33/DIG. 10 |

FOREIGN PATENTS OR APPLICATIONS

| 22,869 | 10/1930 | Australia | 33/180 R |

Primary Examiner—Louis A. Prince
Assistant Examiner—Richard H. Stearns
Attorney, Agent, or Firm—Melvin R. Stidham

[57] ABSTRACT

The disclosure is of a device for marking on wall panels the precise location at which openings are to be cut to receive electrical outlet boxes. Perpendicular surfaces on the device are placed against horizontal and vertical surfaces on the outlet box and tape rules fixed on the device are extended to engage a vertical surface and a horizontal surface against which the panel edges will be placed. Placement of the tapes at the complementary vertical and horizontal edges of the panel will position the perpendicular surfaces where the opening is to be cut.

4 Claims, 4 Drawing Figures

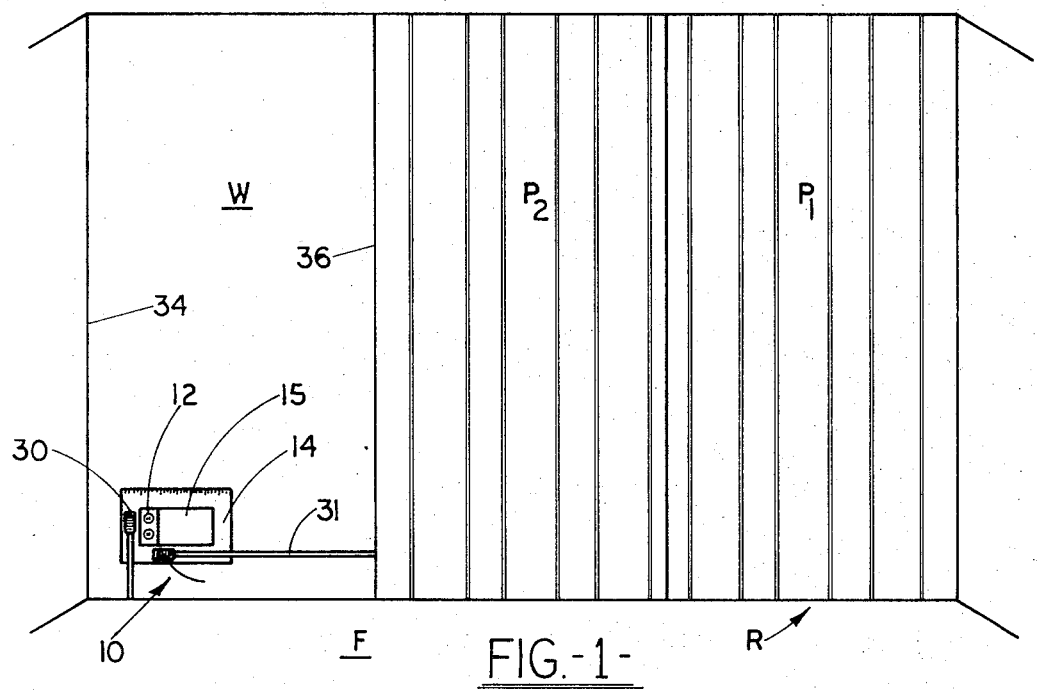
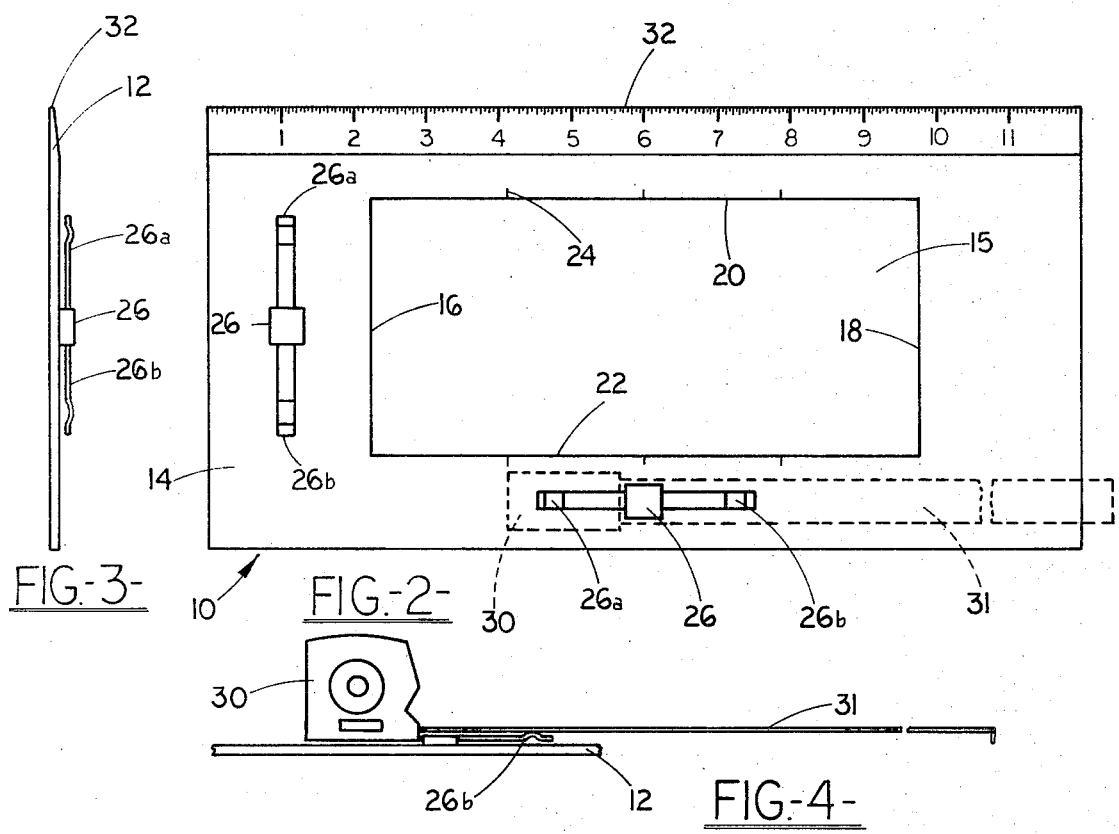

3,842,510

ELECTRIC OUTLET BOX LOCATOR

BACKGROUND OF THE INVENTION

In constructing interior walls by covering studs with gypsum or wood panels, it is necessary to measure precisely the location of electric outlet boxes previously mounted on or between the studs. If an error is made in measuring the relative location of the outlet box with respect to edges of the panel to be installed, an entire panel may be ruined. Accordingly, the precise location of openings to be cut from panels to accommodate outlet boxes can be tedious and time consuming.

OBJECTS OF THE INVENTION

It is an object of this invention to provide a device for quickly and precisely locating the position of electrical outlet boxes with respect to the edges of the panel to be installed.

It is a further object of this invention to provide a device for quickly marking on a panel to be installed the relative location and size of an opening to receive electrical outlet boxes.

It is a further object of this invention to provide a device for simplifying the location of electrical outlet boxes on wall panels.

Other objects and advantages of this invention will become apparent from the description to follow when read in conjunction with the accompanying drawings.

BRIEF SUMMARY OF THE INVENTION

In carrying out this invention there is provided a template member of plastic or the like having a rectangular window therein of a size large enough to accommodate therein the largest available standard electric outlet box. Adjacent to one of the vertical and one of the horizontal edges of the window are secured conventional tape rules. In operation, the window is placed over the outlet box and against a vertical and a horizontal side thereof. Then, the tape rules are extended to engage reference surfaces. For example, the horizontal tape rule may be extended to engage a corner, a window opening, or the edge of the previously placed panel, and the vertical rule may be extended to touch the floor or base-board. Then, the template is placed on the panel to be installed with the tape rules still extended and, by engaging them with that side edge which will engage the vertical reference surface and the bottom edge, respectively, the template window will automatically be situated at the location of the outlet box. Thereafter, the edges of the template window may be used as straight edges to mark the profile of the outlet box. Marks along the horizontal window edges indicate the width of single, double and other standard size outlet boxes so that a line may be readily drawn to indicate the appropriate window width.

BRIEF DESCRIPTION OF THE DRAWINGS

In the drawing:

FIG. 1 is an isometric view of the interior of a room showing the use of the electric outlet box location of this invention;

FIG. 2 is a top plan view of the electric outlet box locator;

FIG. 3 is an end view of the electric box locator;

FIG. 4 is a partial end view of the outlet box locator with a tape rule in place thereon.

DESCRIPTION OF A PREFERRED EMBODIMENT

Referring now to the drawings with greater particularity, there is shown in FIG. 1 a room R to the walls of which a series of panels $P_1$, $P_2$, etc., are being applied. The electric outlet box locator 10 of this invention is shown positioned adjacent to an electric outlet box 12 located on the wall W to which the panels are being applied.

Referring now to FIG. 2 the outlet box locator 10 comprises a template 14 of relatively rigid plastic or the like in which is formed a rectangular window 15 including vertical sides 16 and 18, and horizontal sides 20 and 22. The vertical sides 16 and 18 are of a height corresponding to the standard height of an electric outlet box and the horizontal sides 20 and 22 are of a length at least as great as the largest conventional electrical outlet box. Markings 24 along the horizontal sides indicate the width of various standard size outlet boxes, e.g. single, double, triple, etc.

A first pair of spring clips 26 is secured adjacent to the left hand vertical side 16 and a second horizontal pair of spring clips 28 is secured adjacent the horizontal side 22. As shown in FIG. 4, each spring clip 26, 28 is adapted to receive a conventional tape rule 30 by inserting the appropriate spring clip just below the tape 31. Hence, by placing the tape rule 30 on the left-hand horizontal spring clip 28a the tape rule may be extended to measure distances to the right of the outlet box locator 10 and by placing it on the right hand clip 28 distances to the left may be measured. Similarly, by placing a tape rule on the top vertical spring clip 26a distances to a lower surface may be measured and by placing it on the lower vertical clip 26b distances to a higher surface may be measured.

It is to be understood that the specific clips 26 and 28 are shown merely by way of illustration and that the tape rules 30 may be permanently or releasably attached to the template 14 by any of a variety of means.

Etched along the upper surface 32 of the template 14 are units of length, e.g., inches and fractions thereof.

In operation, a tape measure is applied to one clip of each of both pairs thereof 26 and 28 and the template 14 is placed over the electric outlet box 12 so that the vertical surface 16 and horizontal 20 are engagement with the complementary vertical and horizontal surfaces of the outlet box. Then, the tape measures are extended to engage suitable reference surfaces. For example as shown in FIG. 1 the horizontal tape rule may be extended to engage the corner of the wall 34 or as shown, the edge 36 of the previously placed panel $P_2$. Similarly, the vertical tape rule may be extended to engage the most convenient horizontal surface, in this case the floor F. Then, with the tape rules still extended the template may be placed on the next panel to be applied (not shown) and with the ends of the tape rules engaging the right-hand edge and bottom of the panel, respectively, the template will automatically be located in the proper relative position for the outlet box. Then, with a pencil or other suitable marking device a mark is made along the vertical edge 16 and along the horizontal edges 20 and 22 out as far as the appropriate width marking at 24. The second vertical side for the opening may then be marked in and the opening cut from the panel.

If the vertical reference surface, e.g., the edge 36 of the adjacent panel is located so close to the outlet box 12 that the template 14 overlaps it and renders the horizontal tape rule 30 useless, the horizontal distance may be read directly from the ruled top edge 32 of the template.

While this invention has been described in conjunction with a preferred embodiment thereof it is obvious that modifications and changes therein may be made by those skilled in the art without departing from the spirit and scope of this invention.

What is claimed is:

1. An electrical outlet box locator comprising:
    a template member having a window opening therein presenting a pair of straight, internal perpendicular surfaces adapted to engage vertical and horizontal outer surfaces of an outlet box;
    one of said perpendicular surfaces being at least as long as the width of a standard multiple outlet box;
    markings along said one perpendicular surface indicating various standard widths for outlet boxes; and
    a pair of extensible members on said template member adapted to be extended in directions parallel to said perpendicular surfaces.

2. The electrical outlet box locator defined by claim 1 wherein:
    said extensible members are tape rules.

3. The electrical outlet box locator defined by claim 1 including::
    means on said template member releasably securing each of said extensible members for extension in either one of opposing directions parallel to a perpendicular surface.

4. The electrical outlet box locator defined by claim 1 including:
    a ruling surface on said template member disposed parallel to one of said perpendicular surfaces; and markings adjacent said ruling surface indicating increments of length therealong.

* * * * *